United States Patent Office 3,801,674
Patented Apr. 2, 1974

3,801,674
**GRAFT COPOLYMERS BASED ON AMORPHOUS
1,2-POLYBUTADIENE**
Francois Dawans, Bougival, and Emmanuel Goldenberg, Poissy, France, assignors to Institut Francais du Petrole des Carburants et Lubrifiants
No Drawing. Filed Apr. 29, 1971, Ser. No. 138,811
Claims priority, application France, May 6, 1970, 7016708
Int. Cl. C08f 15/04, 15/40
U.S. Cl. 260—879          6 Claims

ABSTRACT OF THE DISCLOSURE

Graft copolymers comprise amorphous 1,2-polybutadiene and at least one homo- or co-polymer of a mono- or di-olefinic hydrocarbon. They are manufactured by reacting amorphous 1,2-polybutadiene with a mono- or di-olefin or a polymer thereof, in the presence of a conventional polymerization catalyst, preferably a coordination catalyst.

---

This invention discloses new graft copolymers comprising amorphous 1,2-polybutadiene and at least one homo- or co-polymer of a mono- or di-olefinic hydrocarbon.

It particularly relates to new co-polymers comprising an amorphous 1,2-polybutadiene substrate and grafted thereon, sequences of at least one homo- or co-polymer of a mono- or di-olefinic hydrocarbon, particularly stereo regular sequences of a conjugated di-olefin.

It also relates to a process for manufacturing the said graft co-polymers from amorphous 1,2-polybutadiene used as substrate for the grafting reaction.

Amorphous 1,2-polybutadiene is known for example from U.S. Pat. 3,451,987: it may be defined as containing at least 90% of 1,2-units, having a crystallinity of less than 2% and an intrinsic viscosity of at least 0.5 dl./g., for example from 0.5 to 10 dl./g. This polymer, which has a gel content lower than 1%, is soluble in ethyl ether, for example in a proportion of at least 1 gram per liter. Its crystallinity may be determined by X-ray spectrography as disclosed, for example, in the Belgian Pat. No. 549,554 or French Pat. No. 1,154,938. Its microstructure may be determined by the infrared spectrometric method of Ciampelli et al., La Chemica e l'Industria 41, 1959, page 758.

Finally its intrinsic viscosity may be determined in the manner described in U.S. Pat. No. 3,451,987.

The aliphatic or alicyclic mono- or di-olefinic hydrocarbons which may be grafted on amorphous 1,2-polybutadiene in the form of homo- or co-polymeric chains, have for example from 2 to 10 carbon atoms. Ethylene, propylene, 1-butene, 1,3-butadiene, isoprene, piperylene, cyclopentene and 1,5-cyclooctadiene are examples of such hydrocarbons.

The graft co-polymers may contain at will various proportions of amorphous 1,2-polybutadiene and grafted chains of mono- or di-olefinic hydrocarbons, for example from 2 to 98% and preferably from 5 to 20% by weight of amorphous 1,2-polybutadiene.

The specific properties of the graft co-polymers depend essentially on the nature and the proportion of the monomer grafted on amorphous 1,2-polybutadiene, and the distribution and the length of the grafted sequences. These advantageous properties do not result from the mere addition of the properties of the respective components. Thus, certain specific properties of amorphous 1,2-polybutadiene, such as a low rebound elasticity associated with an internal heat release lower than that of, for example, butyl rubber, confer to the graft copolymers or their mixtures with other polymers, advantageous properties, for example improved impact resistance and flexibility.

According to their composition, the graft copolymers of this invention may also be profitably used to improve the compatibility of homo-polymer mixtures, for example those comprising a plastic polymeric phase and an elastomeric polymeric phase.

Since the graft substrate has a highly reactive unsaturation, the grafted copolymers may be manufactured according to various grafting techniques by coordination catalysis, for example in the presence of alkali metal derivatives, transition metal complexes or Ziegler-Natta catalysts: this possibility is an advantage of this invention since the graft co-polymers may thus be manufactured according to conventional techniques without requiring a previous grafting of reactive groups on the polymer chain so as to make it reactive in the grafting reaction, as it is usual.

The catalysts of the grafting reaction according to this invention are essentially coordination catalysts. The following are mentioned:

(a) Catalysts of the Ziegler-Natta type, resulting from reacting at least one transition metal compound from any of Groups IVa to VIIa or VIII of the periodic classification with at least one metal compound from any of Groups I to IVb of the periodic classification.

(b) Catalysts comprising at least one alkali metal or an organic derivative thereof.

(c) Catalysts comprising at least one π-organic derivative of a transition metal of any of Groups IVa to VIIa or VIII of the periodic classification.

Among the catalysts of the type (a), attention is directed to those resulting from reacting at least one titanium or vanadium compound with at least one aluminum compound, which are particularly useful for grafting α-mono-olefins, either alone or contained in a mixture. Those which are formed by reacting at least one nickel or cobalt compound with an aluminum compound may be used more particularly for grafting di-olefins, either alone or in a mixture. Those which comprise tungsten or molybdenum are particularly useful for grafting cyclic mono- or di-olefins with ring splitting.

Among the catalysts of the type (b), the organolithium compounds may be used with advantage for grafting sequences of 1,4-cis-poly-isoprene on amorphous 1,2-polybutadiene.

Finally, among the catalysts of the type (c), the nickel π-complexes are particularly convenient for grafting sequences of 1,4-cis- or 1,4-trans-poly-butadiene.

According to this invention, the graft co-polymers may be manufactured as follows: amorphous 1,2-poly-butadiene is dissolved in an inert solvent; the monomer (or mixture of monomers) is added thereto, as well as a conventional polymerization catalyst. The grafting reaction takes place at a temperature of from —50 to +200° C., preferably from 0 to 70° C.

Amorphous 1,2-poly-butadiene does not change the behavior of stereospecific catalysts; thus stereoregular polymers, for example 1,4-cis-polybutadiene, 1,4-cis-poly-isoprene, isotactic polypropylene or a cis- or trans-polypentenamer, may be grafted on the amorphous 1,2-polybutadiene chain.

The grafting process of this invention also constitutes an economic process for obtaining sulfur-curable ethylenepropylene rubbers since the grafted amorphous 1,2-polybutadiene replaces the conventionally added unsaturated termonomer.

According to another embodiment, the graft co-polymers may be manufactured by, first, polymerizing the monomers to be grafted and then, at the end of the reaction, adding amorphous 1,2-polybutadiene; this embodiment is particularly advantageous when little transfer occurs during the chain growth of the (co-)polymer to be grafted, since the "living" character of these chains allows, under appropriate conditions, manufacturing an unreticulated graft copolymer free of homo-polymer.

Since amorphous 1,2-polybutadiene is highly soluble in many organic solvents, many of them may be used in the grafting reaction, for example aliphatic or cycloaliphatic hydrocarbons such as hexane, heptane, isooctane or cyclohexane, aromatic hydrocarbons such as benzene, toluene or xylene, halogenated solvents such as dichlorethane, chlorobenzene, chloroform or carbon tetrachloride, ethers such as ethyl ether, or ketones such as acetone, methylethylketone or heptanone, which constitutes another advantageous feature of this invention.

Although any proportion of reactants may be used, those mixtures which contain from 1 to 50 grams of amorphous 1,2-polybutadiene and 5 to 750 grams of graftable monomer per liter of reaction solution, generally result in graft co-polymers containing from 2 to 98% by weight of amorphous 1,2-polybutadiene.

The amorphous 1,2-polybutadiene content of the co-polymer is chosen according to the desired properties of the resulting products and their uses. Thus, for example, those graft co-polymers which contain from 5 to 20% by weight of amorphous 1,2-polybutadiene may be used to improve the impact resistance and the mechanical properties of various plastic materials.

The following non-limitative examples are given only for illustrative purposes.

EXAMPLE 1

1.2 grams of amorphous 1,2-poly-butadiene of an intrinsic viscosity of 6 dl./g., as determined in toluene at 30° C., and a Mooney viscosity ML (1+4) 100 of 73, are dissolved in 200 ml. of normal heptane. 36 grams of propylene, 2.4 grams of monochlorodiethylaluminum (20 mM.) and 0.6 g. of TiCl$_3$ (4 mM.) are successively added thereto, and the reaction mixture is stirred at 30° C. for 2 hours. Ungrafted 1,2-polybutadiene is separated, for example, by ethyl ether extraction, and also polypropylene by normal heptane extraction; there remains 27 grams of graft co-polymer containing 3% by weight of polybutadiene.

EXAMPLE 2

Propylene is reacted with the catalyst system $$Et_2AlCl + TiCl_3$$

at 30° C. for one hour, as described in Example 1. Then the solution of amorphous 1,2-polybutadiene is added to the reaction mixture; the reaction is continued for 1 hour at 30° C. and there are obtained 32 grams of copolymer containing 84% of the reacted amorphous 1,2-polybutadiene.

EXAMPLE 3

10 grams of amorphous 1,2-polybutadiene of an intrinsic viscosity of 2.4 dl./g., as determined at 30° C. in toluene, are dissolved in 250 ml. of normal heptane maintained at 50° C. under a constant pressure of 0.4 atmosphere of ethylene. 0.45 gram of triethylaluminum and 0.38 gram of titanium tetrachloride are added thereto. After stirring for 4 hours, 22 grams of a copolymer containing 40% by weight of polybutadiene are obtained.

EXAMPLE 4

Amorphous polybutadiene of viscosimetric weight 60,000 and containing 92% of 1,2-units is used for producing an ethylene/propylene/polybutadiene copolymer.

2 grams of said polybutadiene are dissolved in 100 ml. of hexane contained in a reactor under inert atmosphere. The reactor is then fed with propylene under 0.6 atmosphere; then 2 ml. of a solution of 5 ml. of ethylaluminum sesquichloride in 50 ml. hexane and finally 5 ml. of a solution of 1 ml. of vanadium oxytrichloride in 50 ml. of hexane are introduced thereinto. The resulting mixture is stirred for 1 hour at room temperature under a 0.7 atmosphere constant pressure of a mixture of ethylene and propylene by equal volumes.

Gas is removed from the reactor and the content thereof is poured into alcohol for completing the reaction. There are thus obtained 12.4 grams of a gel-free, hydrocarbon-soluble co-polymer containing 14% by weight of polybutadiene.

EXAMPLE 5

1.2 grams of monochlorodiethylaluminum and 0.46 gram of titanium trichloride are added to a solution of 56 grams of 1-butene in 250 ml. of normal heptane. The reaction mixture is stirred at 10° C. for 1 hour. 4 grams of polybutadiene according to Example 4, dissolved in 100 ml. of normal heptane, are added thereto and the mixture is stirred at 30° C. for 30 minutes. Ungrafted polybutadiene is removed by ethyl ether extraction, and there are obtained 44 grams of a copolymer containing 7% by weight of polybutadiene.

EXAMPLE 6

200 grams of cyclopentene, 1.58 grams of tungsten hexachloride, 0.37 gram of epichlorhydrin and 0.992 gram of tri-isobutyl aluminum are added at −10° C. to a solution of 20 grams of polybutadiene with a 1,2-units content of 90% and a viscosimetric weight of 110,000 in 400 ml. of chlorobenzene.

The mixture is maintained at 0° C. for 4 hours; alcohol is added to stop the polymerization reaction and the polymer is isolated by precipitation. Ungrafted polybutadiene is extracted as in Example 5, and there are obtained 167 grams of a product whose microstructure determined by infra-red spectrometry consist of 7.2% of vinyl double bonds —CH=CH$_2$ and 91% of trans

—CH=CH— double bonds.

EXAMPLE 7

0.15 gram of butyl lithium is added to a solution of 60 grams of isoprene in 100 ml. of isooctane. The mixture is stirred at 30° C. for 8 hours. There are added 15 grams of amorphous polybutadiene containing 95% of 1,2-units, with an intrinsic viscosity of 4 dl./g., dissolved in 600 ml. of isooctane. The resulting mixture is stirred at 30° C. for 1 hour, then poured into alcohol. There are thus obtained 52 grams of an elastomeric co-polymer whose microstructure comprises 24% of 1,2-butadiene units and 68% of 1,4-cis-isoprene units.

EXAMPLE 8

1.06 grams of bis (π-allyl nickel trifluoracetate) of formula (π-C$_3$H$_5$NiOOCCF$_3$)$_2$ are added to 52 grams of butadiene in 240 ml. of toluene, to initiate the polymerization.

After 1 hour, there are added 6 grams of 1,2-polybutadiene of Example 7 dissolved in 160 ml. of toluene, and the mixture is stirred at 30° C. for 2 hours. There are thus obtained 47.6 grams of a co-polymer the microstructure of which comprises 4.2% 1,2-units, 93.8% 1,4-cis-units and 2% 1,4-trans-units.

EXAMPLE 9

140 grams of 1,5-cyclooctadiene, 0.66 gram of tetrabutyltin and 0.17 gram of tungsten oxytetrachloride are added to a solution of 5 grams of 1,2-polybutadiene of Example 6 in 100 ml. of chlorobenzene. After 2 hours at room temperature, the polymerization is stopped by adding methanol, and the polymer is precipitated in alcohol. The resulting dried product amounts to 77 grams. An infra-red spectrometric examination shows that the polymer is a polybutadiene containing 5.6% of 1,2-units, 64% of 1,4-cis-units, and 30.4% of 1,4-trans-units.

What we claim as this invention is:

1. A graft copolymer consisting essentially of 2–98% by weight of amorphous 1,2-polybutadiene substrate having an intrinsic viscosity as determined in toluene at 30° C. of at least 0.5 dl./g. and containing at least 90% 1,2-units, and grafted sequences of at least one homopolymer of a monomer selected from the group consisting of the aliphatic and alicyclic monoolefinic and conjugated diolefinic hydrocarbons of 2–10 carbon atoms or copolymer consisting of at least two monomers selected from the group consisting of the aliphatic and alicyclic, monoolefinic and conjugated diolefinic hydrocarbons of 2–10 carbon atoms, said graft sequences being stereo regular.

2. A graft copolymer according to claim 1 wherein said monomer is isoprene.

3. A graft copolymer according to claim 1 wherein said monomer is propylene.

4. A graft copolymer according to claim 1 wherein said monomer is cyclopentene.

5. A graft copolymer according to claim 1 wherein said grafted sequence is an ethylene propylene copolymer.

6. A graft copolymer as defined by claim 1 wherein said amorphous 1,2-polybutadiene substrate is present in a concentration of 5–20% by weight.

References Cited

UNITED STATES PATENTS

| | | | |
|---|---|---|---|
| 3,494,983 | 2/1970 | Diem | 260—878 |
| 3,652,729 | 3/1972 | Brodoway | 260—878 |

STANFORD M. LEVIN, Primary Examiner